United States Patent [19]
Ozyagcilar et al.

[11] Patent Number: 4,623,532
[45] Date of Patent: Nov. 18, 1986

[54] CATALYSTS FOR SYNTHESIS OF AMMONIA

[75] Inventors: Mehmet N. Ozyagcilar, Acihadem, Turkey; Milton W. Davis, Jr., Columbia, S.C.

[73] Assignee: University of South Carolina, Columbia, S.C.

[21] Appl. No.: 509,973

[22] Filed: Jun. 30, 1983

Related U.S. Application Data

[63] Continuation of Ser. No. 413,522, Aug. 31, 1982, abandoned, which is a continuation of Ser. No. 162,314, Jun. 23, 1980, abandoned, which is a continuation of Ser. No. 936,455, Aug. 24, 1978, abandoned, which is a continuation of Ser. No. 799,099, May 20, 1977, abandoned.

[51] Int. Cl.[4] ............................................... C01C 1/04
[52] U.S. Cl. ..................................... 423/362; 423/645
[58] Field of Search ....................... 423/362, 363, 645

[56] References Cited

U.S. PATENT DOCUMENTS 1,313,314  8/1919  Metzger ............................... 423/362
3,382,106  5/1968  Jung et al. ........................... 423/645
3,776,855  12/1973 Raymond et al. .................... 423/645

OTHER PUBLICATIONS

Reilly et al, "Formation and Properties of Iron-Titanium Hydride", *Inorganic Chemistry*, vol. 13, No. 1 (1974), pp. 218–222.

Primary Examiner—John Doll
Assistant Examiner—Wayne A. Langel
Attorney, Agent, or Firm—Brumbaugh, Graves Donohue & Raymond

[57] ABSTRACT

Bi-metallic alloys of iron and titanium are employed as catalysts for reacting nitrogen and hydrogen to yield ammonia. The binary alloy composition is first activated by removing surface oxides with hydrogen gas at elevated temperatures and pressures. The particle size of the catalyst may then be reduced by one or more dehydriding and hydriding steps.

7 Claims, No Drawings

CATALYSTS FOR SYNTHESIS OF AMMONIA

This application is a continuation of application Ser. No. 413,522 filed on Aug. 31, 1982, abandoned, which is a continuation of copending application Ser. No. 162,314 filed June 23, 1980, now abandoned, which application was a continuation of copending application Ser. No. 936,455 filed Aug. 24, 1978, now abandoned, which application was a continuation of copending application Ser. No. 799,099 filed May 20, 1977, now abandoned.

BACKGROUND OF INVENTION

This invention relates to the synthesis of ammonia from molecular nitrogen and hydrogen through the use of a new catalyst and novel processes based thereon. Ammonia is an important raw material in the chemical industry, particularly in the production of synthetic fertilizers. Agricultural research has shown that nitrogen is an indispensable ingredient of fertilizers for crops. The major source of that nitrogen at the present time is ammonia and one of the major goals of chemical technology in the fertilizer field is the production of ammonia at faster rates and with correspondingly lower costs.

Prior art methods for the production of ammonia from gaseous nitrogen and hydrogen have employed iron catalysts of various types. However, such catalysts require high temperatures and pressures necessitating expensive equipment of relatively low capacity, and are rapidly consumed at such temperatures and pressures by various degradation mechanisms.

Research on the synthesis of ammonia has also progressed in the direction of room temperature synthesis in aqueous solutions where either biological "nitrogen-fixation" conditions are simulated, or a metal salt or complex is used as a catalyst together with a reducing agent. Although aqueous studies are still at the fundamental research level and have not yet been commercialized, it has been found that the metals of heterogeneous catalysts effective to synthesize ammonia at high temperatures from gaseous nitrogen and hydrogen also catalyze the ammonia synthesis when present as a salt or complex in aqueous solutions.

Although gaseous nitrogen and hydrogen theoretically can be combined at room temperature and atmospheric pressure to produce ammonia at an equilibrium yield of 95.5% on thermodynamic grounds, there is no catalyst or method for ammonia synthesis in the prior art that can be employed at room temperature to produce ammonia from gaseous nitrogen and hydrogen at commercially feasible rates. Therefore, it has been necessary to employ much higher temperatures in the synthesis of ammonia to achieve satisfactory reaction rates. The iron catalysts previously used produce no appreciable ammonia from gaseous nitrogen and hydrogen at temperatures below approximately 360° C. Even higher temperatures are therefore necessary for acceptable yields. However, higher temperatures in turn result in a drastic reduction in the thermodynamic equilibrium yield of the reaction due to its exothermic nature. Reduction in equilibrium yields with increasing temperatures can only be partly compensated for by increasing the operating pressure, and the pressures needed closely approach the design limits of the equipment presently available for industrial application.

Prior art processes for the synthesis of ammonia from gaseous nitrogen and hydrogen over commercial iron catalysts operate at temperatures around 500° C. The equilibrium yield of the reaction at this temperature with only one atmosphere of pressure is well below 0.1%. Higher pressures in the range of 150 atmospheres are therefore employed to compensate for the low yield at ambient pressure. Such high pressures result in high equipment and maintenance cost. Furthermore, equilibrium yields attained at such elevated pressures are usually less than 15%. This means that a substantial portion of the effluents from reactor vessels must be recycled one or more times, adding substantially to the cost of production both in the form of added equipment and longer operating times for separation and recycle of the product stream.

By reason of the foregoing thermodynamic and kinetic considerations, the cost of producing ammonia by prior art methods is quite high, involving relatively slow production rates and costly equipment. The cost of the iron catalyst itself is also quite substantial, mainly because special manufacturing processes must be utilized to improve the catalytic properties of the iron. Thus, additional components called promoters must be added to the iron and, in most cases, both the iron and the promoters must be supported on a special carrier. The addition of the catalytic constituents to the carrier is a manner to permit sufficient contact between those constituents and the gaseous reactants is quite expensive.

SUMMARY OF INVENTION

The foregoing disadvantages encountered with reactions between nitrogen and hydrogen over prior art catalysts are avoided through the use of the present invention. The novel catalyst of this invention for the first time allows the use of substantially lower operating temperatures and pressures in achieving commercially feasible production rates with greatly improved thermodynamic equilibrium values. This new catalyst is comprised of a hydrided binary or bi-metallic alloy of iron and titanium.

The reaction rates attainable with this new process at any given temperature and pressure are at least an order of magnitude (factor of 10) and sometimes several orders of magnitude greater than reaction rates experienced with prior art catalysts and processes. Consequently, the cost of ammonia production is substantially lowered. Furthermore, equipment requirements are much less stringent and less costly by reason of the lower operating pressures that can be employed at the process temperature selected. In addition, the catalyst itself is free from many problems commonly encountered with prior art catalysts such as sintering and physical attrition. To the contrary, it has been found that the catalytic activity of the iron titanium alloys employed in the present invention increases with aging in the presence of the hydrogen component of the reactant atmosphere. This enhancement of activity is the result of cracks and fissures formed in the catalyst particles, both microscopically (surface cracks) and macroscopically (breakage into smaller particles), with the attendant increase in the active surface area of the catalyst. There is also much less poisoning or deactivation of the catalyst through smothering of adsorbing sites by the adsorption of impurities that normally exist is commercially available nitrogen and hydrogen reactants. With proper control of the process conditions, activation of the catalyst bed can continue simultaneously with the production reaction.

It is therefore an object of this invention to provide a novel process for the manufacture of ammonia from hydrogen and nitrogen.

A further object of the invention is to provide a catalytic process for making ammonia from gaseous hydrogen and nitrogen at substantially increased rates of production.

Another object of the invention is to provide a commercially economic process for the production of ammonia from gaseous hydrogen and nitrogen at lower temperatures and pressures than heretofore possible, and to thereby reduce the cost of process equipment and operating and maintenance costs associated therewith.

A further object of the invention is a process for producing ammonia with a catalyst which is resistant to poisoning by impurities that usually exist in commercially available hydrogen and nitrogen reactant gases.

A still further object of the present invention is to provide a catalytic process capable of yielding higher rates of ammonia production at ambient temperatures than heretofore possible.

Another object of the present invention is to provide a catalyst which will promote ammonia synthesis in aqueous solutions containing molecular hydrogen and nitrogen.

A still further object of the invention is the identification of a binary metal alloy capable of weakening or breaking the chemical bonds of nitrogen and hydrogen molecules and the utilization of such alloy as a catalyst for the production of ammonia from molecular hydrogen and nitrogen.

A still further object of the present invention is to provide a commercial process for the catalytic production of ammonia wherein the cost of the catalyst itself is substantially less than the cost of prior art catalysts for such processes.

DETAILED DESCRIPTION OF PREFERRED EMBODIMENT

The catalyst of the present invention is comprised of a binary or bi-metallic alloy of iron and titanium. Although any of the alloys of these two metals is believed to be catalytically active, compositions in the range of 0.5 moles to 3.0 moles of titanium per mole of iron are preferred. Alloy samples with compositions outside of this range are not commercially available at the present time due to difficulties encountered in their manufacture. More definitively, it has been found that when activated by hydrogen, these alloy compositions form extremely active catalysts for the production of ammonia from gaseous nitrogen and hydrogen, particularly where a hydrided titanium phase is present in the alloy.

The specific alloys employed in the preferred embodiment are available from the International Nickel Company. These alloys are further described in a book entitled *Constitution of Binary Alloys*, First Supplement, as authored by R. P. Elliott and published by McGraw-Hill, New York, N.Y., 1965, and in a paper of Reilly, et al. referenced more fully below. The alloys are formed from relatively pure iron and titanium by melting process requiring temperatures in the range of 1500° to 1900° C. Although not to be construed as a limitation, the alloy compositions preferred and considered to be the most active should contain as one of the alloy phases the bi-metallic compound having a titanium to iron mole ratio of 1.0. Although the catalysts can be made from commercial grade iron, the purity of electrolytic iron is preferred.

The alloy composition with a titanium to iron mole ratio of one to two is also an intermetallic compound. However, alloys with a titanium to iron ratio greater than 1 consist of two phases, namely, the intermetallic compound having a titanium to iron mole ratio of one and pure titanium, the former being converted to iron titanium hydride and the latter to titanium dihydride during the activation steps. Titanium dihydride is a stable compound which may remain as such throughout the use of the catalyst as long as it remains in contact with significant amounts of hydrogen.

The following range of compositions for iron-titanium alloys have been determined to be catalytically active for combining molecular hydrogen and nitrogen to produce ammonia and are listed in the order of increasing catalytic activity for this reaction: ½ mole Ti to 1 mole Fe, 1 mole Ti to 1 mole Fe, 1.1 moles Ti to 1 mole Fe, 2 moles Ti to 1 mole Fe, and 3 moles Ti to 1 mole Fe. Thus, the titanium to iron ratio of three is the most active in ammonia synthesis and the ratio of 0.5 is the least active. As previously explained, compositions richer in titanium than a mole ratio of 3 to 1 do not appear to be commercially available due to difficulties experienced in their manufacture. However, it is believed that even higher catalytic activities may be attainable if alloy compositions can be achieved having titanium to iron mole ratios greater than 3. Therefore, the scope of this disclosure is intended to cover the full range of possible compositions of titanium-iron bi-metallic alloys. Based on the foregoing, the preferred bi-metallic alloy used as a catalyst in this invention is that having a composition of 3 moles of titanium to 1 mole of iron.

The catalysts of the invention are active for ammonia formation at all temperatures around and above 100° C. and at all pressures at and above atmospheric, the higher the temperature or the pressure or both, the greater the reaction rates attainable. The upper limits of temperature and pressure for production reactions are set only by the physical design parameters of the equipment employed.

While not intending to be bound by any specific theory with regard to the various physical and chemical mechanisms which may be involved in the catalytic reaction, it is believed that both the hydride form of the alloy, namely iron titanium hydride, and the iron titanium alloy itself are catalytically active in the ammonia production reaction. It also appears that the activity of the catalyst increases with increasing amounts of free titanium metal within the alloy matrix and along the boundaries between the different alloy phases. It may be that the small metal particles are converted to the titanium dihydride during activation processes employing hydrogen.

Since catalytic activity appears to increase with increasing amounts of titanium dihydride present, the most active phase of the catalyst may be titanium dihydride. However, it is also clear that titanium dihydride exhibits significant catalytic activity only in the presence of the iron-titanium bi-metallic compound with a titanium to iron ratio of 1, a single phase alloy. Therefore, these two compounds may be thought of as having different but complementary functions and as acting synergistically in the catalytic synthesis of ammonia. For further information on the independent properties of each of these compounds, particular reference is made to the article entitled "Formati and Properties of Iron Titanium Hydride" by J. J. Reilly and R. H. Wiswall, Jr., of Brookhaven National Laboratory, published in *Inorganic Chemistry,* Vol. 13, No. 1, 1974, at Pp. 218-222, and to the book by W. M. Mueller, et al., entitled *Metal Hydrides* as published by Academic Press, New York, N.Y. 1968.

The iron-titanium alloy is therefore activated with hydrogen, preferably as a separate series of steps prior to its use as the catalyst in the ammonia production reaction. The hydriding steps first remove reaction inhibiting oxides and other impurities on the catalyst particles and then produces iron titanium hydrides and titanium dihydride. As received from the manufacturer, the alloy is in particulate form of relatively large size (greater than 16 mesh) and is coated with an oxide layer. In this form, the bi-metallic alloy will not form the hydrides which are believed to be one of the active forms of the catalyst. The activation steps also remove other surface and internal impurities such as carbon and nitrogen compounds and adsorbed gases other than nitrogen and hydrogen.

Activation of the catalyst is preferably accomplished by first subjecting it to hydrogen gas at temperatures is the range of 200° C. to 400° C. and pressured in the range of 150 to 200 psia for an extended period. This initial immersion is followed by successively outgassing and then pressurizing the catalyst with hydrogen so that the alloy is alternately dehydrided and hydrided. This second activation process breaks up the catalyst particles into smaller particles and also produces multiple cracks in the surface of each individual particle, thereby greatly increasi the reactive surface area of the catalyst bed. The dehydridi cycle is carried out at approximately 200° C. with outgassing by helium purging at approximately atmospheric pressure, and the hydriding cycle is generally carried out at ambient temperature (20° to 25° C.) and 1,000 psia. Alternately, outgassing may be accomplished by drawing a slight vacuum of 1 or 2 inches of water on the reactor vessel containing the catalyst bed. This stage of the activation process is preferably continued until the average particle size is 200 mesh or less.

Following the activation steps, a gaseous feed stream comprised of nitrogen and hydrogen is continually passed over the catalyst bed in a production reaction carried out at a temperature and pressure selected for the highest or other desired level of yield of ammonia in the product. Although significant yields of the product are attainable at temperatures as low as 200° C. and pressures as low as atmospheric, commercial. yields generally require higher temperatures in the range of 275° to 325° C. and higher pressures in the range of 500 to 1500 psia (30 to 100 atm.). Even greater temperatures and pressures would further increase reaction rates, but such operations are limited at the present time by restrictions imposed by desi parameters of the process equipment available. In addition higher temperatures could also have adverse effects on the ammonia synthesis reaction by increasing the rate of ammonia dissociation into nitrogen and hydrogen to unaccept levels. In other words, excessively high temperatures could reverse the synthesis reaction because of thermodyna limitations arising from the exothermic nature of the react However, at temperatures and pressures within the ranges specified above, yields approaching 100% of theoretical are attainable.

Catalytic activity appears to be the optimum when the partial pressure of the hydrogen in the reactor vessel is equal to or greater than the equilibrium dissociation pressure of iron titanium hydride. It is therefore felt, as indicated above, that the most active state of the catalyst is the hydride form of the alloy. The partial pressure of the hydrogen to be used at a given temperature to achieve the optimum reaction rate can therefore be determined from the equilibrium dissociation pressure of iron titanium hydride at that temperature, the latter relationship being set forth in the literature. For the specific temperature and pressure relationship utilized in this invention, see particularly the article entitled "Formation and Properties of Iron Titanium Hydride" referenced above.

The preferred processes for both activating the catalyst and subsequently producing ammonia will now be described. A catalyst bed consisting of as purchased alloy particles having a titanium to iron molar ratio of 3 is charged into a conventional reactor vessel, such as that presently used in the production of ammonia with prior art catalysts. The reactor is then heated to 400° C. and outgassed by purging with helium for approximately six to eight hours. Following the helium purge and while maintaining the vessel at 400° C., the reactor is pressurized with hydrogen to 200 psia and maintained at temperature and pressure for approximately four to six hours. This initial activation process removes the oxide films and other adsorbed impurities from the catalyst so as to enhance diffusion of hydrogen into the alloy, as well as to permit adsorption of the reactant gases during the production reaction. This hydrogen treatment is best carried out with the hydrogen gas confined to the reactor vessel in a static condition, instead of utilizing any type of flow regime. Upon removal of the oxide films, titanium dihydride begins forming in the presence of the hydrogen with the evolution of heat.

The second activation process is then commenced by allowing the reactor to cool to near ambient temperature (20° to 25° C.) while continuously purging the catalyst bed with helium to outgas the hydrogen. Upon reaching ambient temperature, the reactor is then pressurized again with hydrogen to a pressure above the equilibrium dissociation pressure of the hydride at the prevailing temperature. A hydrogen pressure of 1,000 psia is sufficient to accomplish this hydriding step at the usual ambient temperatures encountered. After such pressurization has been maintained for approximately one-half hour, the reactor is again heated to approximately 400° C. and immediately allowed to cool upon reaching that temperature while maintaining a helium purge throughout the heating and cooling cycle to outgas the hydrogen in a dehydriding step. These last hydriding and dehydriding cycles are preferably repeated until the desired particle size is attained which usually requires three to four cycles, depending on the original particle size and the dimensions of the catalyst bed. The catalyst is then ready for the production reaction.

Following the last dehydriding step of the second activation process, the reactor is heated to 300° C. and pressurized with hydrogen to 80 atm. A heat composition comprised of 1 mole of nitrogen to 3 moles of hydrogen is then introduced into the reactor and the product stream drawn off on a continuous basis at a flow rate determined by space velocity (ratio of feed rate to total weight of catalyst) which should not exceed 500 cubic meters per hour per ton of catalyst as determined with reference to standard conditions of temperature and pressure. A variety of other feed compositions such as hydrogen to nitrogen mole ratios of 2 to 1 or 1 to 1, may also be employed within the scope of this invention. However, it is desirable to always maintain sufficient hydrogen in the feed stream to achieve continuous activation of the catalyst.

Higher space velocities and corresponding feed rates are also possible, but may give lower yields and would require higher pumping energy inputs. Nevertheless, faster throughout and lower yields may be more economical overall depending on the optimum parameters of the separation and recycle equipment employed to handle the product downstream of the reactor vessel.

The product stream leaving the catalyst bed will contain the nitrogen and hydrogen reactants and the ammonia product. If desired, the ammonia can be separated from the product stream in conventional fashion and the reactants recycled to the reactor vessel. One such separation scheme involves cooling the product stream to a temperature in the range of 25° C. to 100° C., which is usually low enough to totally condense the ammonia product and then passing the stream through a condensate separator and recycling the gas effluent consisting of the uncombined nitrogen and hydrogen back to the reactor. Actual condensate temperature in this case would be determined by the process economics, taking into account the cooling, heating and pumping operations required, as well as the partial pressure of the ammonia in the product stream. Some of the ammonia product might also be recycled, depending of course on the parameters of the separation equipment.

Although but a single embodiment of the present invention has been described, other embodiments and variations will occur to those skilled in the art. For example, the hydrogen and nitrogen reactants may be contacted with the catalyst while in physical states other than a gas. Thus, aqueous solutions and other carriers containing free nitrogen and hydrogen molecules may be passed over or in contact with the catalyst alloy and the hydrogen and nitrogen thereby reacted to produce ammonia. All such processes are within the contemplation of the present invention.

It is possible, of course, to use various features of the specific embodiment described, such as any of the various intermetallic compositions of titanium and iron at other temperatures and pressures, and such uses are intended to be covered by the present invention. It is also possible to combine the titanium and iron intermetallic compounds with known catalytically active metals for this reaction such as ruthenium and osmium, either in the form of mixtures or multi-component (e.g. ternary, quarternary or higher) alloys, or to support those compounds on an inert carrier material or other substrate.

Furthermore, many other changes in the process steps are possible and such changes are within the scope of the disclosure. By way of further example, activation of the catalyst can be achieved, although at a slower rate, by exposure to only the hydrogen in the feed stream itself, particularly if the product stream was to be recycled until the desired level of product was achieved. It is therefore to be understood that the foregoing specification merely illustrates and describes a preferred embodiment of the invention and that other embodiments are contemplated within the scope of the appended claims.

I claim:

1. A method of making ammonia which comprises the step of passing a feed mixture containing gaseous molecular nitrogen and hydrogen over a catalyst comprised of a binary alloy of iron and titanium wherein the catalyst is activated before being exposed to said reactant gases by exposure to gaseous hydrogen to remove impurities from the surface of the catalyst and to form at least one metal hydride.

2. A method according to claim 1 wherein the catalyst is in particulate form and wherein prior to passing said reactants over the catalyst and subsequent to said first catalyst activation process, the catalyst is hydrided by exposure to hydrogen at a pressure at least equal to the equilibrium dissociation pressure of iron titanium hydride at the prevailing temperature and then dehydrided by outgassing the hydrogen.

3. A method according to claim 2 wherein the dehydriding and hydriding cycle is repeated at least once to reduce the size of the catalyst particles and to improve the porosity of the catalyst by inducing the formation of micro-cracks in the surface of each particle.

4. A method according to claim 1 wherein the catalyst includes at least one additional metal catalytically active in reacting hydrogen with nitrogen.

5. A method according to claim 1 wherein the catalyst is supported on an inert carrier.

6. A process for the manufacture of ammonia from nitrogen and hydrogen which comprises the steps of activating a catalyst by:
   (a) contacting said catalyst comprised of a binary alloy of titanium and iron having a molar ratio of titanium to iron in the range of 0.5 to 3.0 with gaseous hydrogen to free the surface of the catalyst from impurities and to form iron titanium hydride;
   (b) hydriding the catalyst by contacting the same with gaseous hydrogen at a pressure at least equal to the equilibrium dissociation pressure of iron titanium hydride at the prevailing temperature of the catalyst;
   (c) dehydriding the catalyst by outgassing the hydrogen; and,
   passing a feed mixture containing gaseous nitrogen and hydrogen over the catalyst after said steps of activating.

7. A process for the manufacture of ammonia according to claim 6 wherein the temperature of the catalyst is maintained at at least 200° C., the pressure of said feed mixture is maintained at at least 30 atm., and the rate of said feed per ton of catalyst does not exceed 500 cubic meters per hour as determined with reference to standard conditions of temperature and pressure.

* * * * *

UNITED STATES PATENT AND TRADEMARK OFFICE
CERTIFICATE OF CORRECTION

PATENT NO. : 4,623,532
DATED : November 18, 1986
INVENTOR(S) : Mehmet N. Ozyagcilar It is certified that error appears in the above-identified patent and that said Letters Patent is hereby corrected as shown below:

Col. 1, bridging lines 61-62, "Reduction" should read --Reductions--;

Col. 2, line 26, "is" should read --in--;

Col. 2, line 64, "is" should read --in--;

Col. 4, line 37, "100°C." should read --180°C.--;

Col. 5, line 1, "Formati" should be --Formation--;

Col. 5, line 35, "dehydridi" should be --dehydriding--;

Col. 5, line 62, "unaccept" should be --unacceptable--;

Col. 5, line 64, "thermodyna" should be --thermodynamic--;

Col. 7, line 11, "throughout" should be --throughput--.

Signed and Sealed this

Seventeenth Day of March, 1987

Attest:

DONALD J. QUIGG

Attesting Officer

Commissioner of Patents and Trademarks